Figure 1:
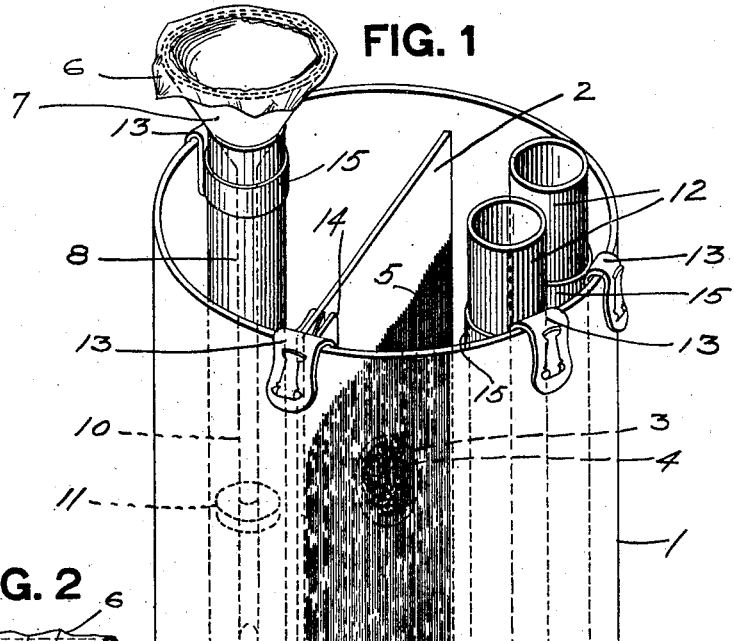

No. 830,679. PATENTED SEPT. 11, 1906.
C. SHANNON.
PAINT DISPLAYING, TESTING, AND DEMONSTRATING DEVICE.
APPLICATION FILED APR. 20, 1905.

WITNESSES.
J. R. Keller
Robert C. Totten

INVENTOR.
Charles Shannon
By Kay Totten & Winter
attorneys

UNITED STATES PATENT OFFICE.

CHARLES SHANNON, OF DAYTON, OHIO.

PAINT DISPLAYING, TESTING, AND DEMONSTRATING DEVICE.

No. 830,679.      Specification of Letters Patent.      Patented Sept. 11, 1906.

Application filed April 20, 1905. Serial No. 256,620.

*To all whom it may concern:*

Be it known that I, CHARLES SHANNON, a resident of Dayton, in the county of Montgomery and State of Ohio, have invented a new and useful Improvement in Paint Displaying, Testing, and Demonstrating Devices, and I do hereby declare the following to be a full, clear, and exact description thereof.

My invention relates to a device for advertising, displaying, demonstrating, and testing paints, oils, varnishes, or other coating liquids or semiliquids, in a practical, speedy, and attractive manner, and which is so constructed that it can be placed upon the table or desk of architects, engineers, purchasing agents, dealers, handlers, or consumers of such materials.

Paints, oils, varnishes, and materials for kindred uses must possess certain working, wearing, and keeping qualities in order to effectively serve their purpose and meet the requisites of the trade. The most essential properties are, first, consistency, color, thickness of the mixture, and thoroughness of intermingling of the solids and liquids, (pigments, gums, oils, thinners, &c.,) so as to keep in workable condition for indefinite periods without separating, curdling, precipitating or hardening in storage receptacles or holders; second, the working properties most essential are smoothness of spreading or flowing under the brush, completeness of covering the surface, luster, uniformity and thickness of the layers or coats, and the setting and drying of the coats free from pits, streaks, or sags; third, its durability or wearing property depends upon the elasticity, adhesion of the thin layers, films, or coatings, also their resistance to atmospheric and gaseous influences, together with their properties for repelling moisture or liquids. In order that architects, engineers, purchasing agents, dealers, handlers, or consumers of such materials may determine that the products offered them are possessed of all these properties, it is desirable that they have some convenient, compact, and speedy method of testing the same.

My invention has for its object to furnish a device whereby these several properties can be determined, tested, or demonstrated.

To this end the invention consists, generally stated, in a suitable support, preferably a glass receptacle, having supported vertically therein a smooth plate, preferably of glass, isinglass, or other transparent material, on which the materials can be spread and remain in a vertical position until dry, so that any tendency of the wet coating to drop, run, streak, or sag is readily shown, as well as the uniformity, thickness of layer, color, and drying properties of such coating are readily demonstrated. This receptacle also contains therein one or more tubes, preferably of glass, for containing a sample or samples of the product, wherein its consistency or homogeneity and any tendency to evaporate, separate, precipitate, or harden may be observed from time to time. This receptacle also contains therein one or more upright tubes, preferably of glass, in the mouth of which is held a small funnel, in which rests a coating-film folded in filtering form, which is filled with water or an alkali or acid liquid to determine the water-repellant properties of said film or coating.

The device also contains means for testing the moisture or liquid repellant properties of the coating material.

Figure 2:
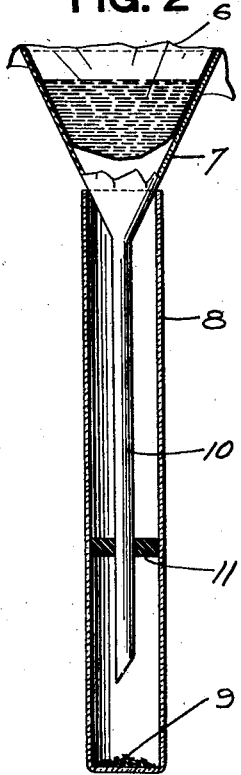
Figure 3:
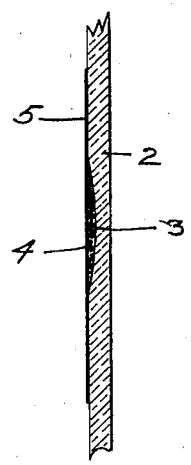
Figure 4:
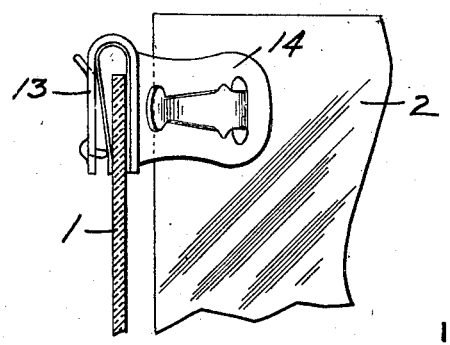

In the accompanying drawings, Figure 1 is a perspective view of my device. Fig. 2 is an enlarged detail view illustrating one manner of testing the water or moisture repellant qualities of the material. Fig. 3 is a detail sectional view of the glass plate upon which the paint or other material is coated, and Fig. 4 is a detail view of one of the clamps used.

My device has been designed with a view of being left upon the table or desk of users or prospective purchasers of paints, oils, varnishes, or the like, and I have therefore kept in view the neatness or attractiveness of the device, as well as having the parts so arranged and constructed that all tests are readily visible at all times.

My device contemplates a suitable support for the different testing devices, and for neatness and visibility of all tests this preferably is made in the form of a glass receptacle 1, which is shown in the form of a straight-sided tumbler or cup. In this receptacle is supported in vertical position a smooth plate 2, which also preferably will be of glass, isinglass, or other transparent material, for reasons hereinafter referred to. Upon this plate a coating of the paint, oil, varnish, or other material to be tested will be spread in order to test the smoothness of spreading of the material. This plate is very smooth and held in a vertical position, so that if the material has any tendency to run, streak, or sag this test will bring out any such defect. The coating of material on the plate is readily visible through the receptacle, so that it can be readily seen whether the material dries smoothly and uniformly.

In order to test the water and moisture repellant qualities of the paint or other material, two tests can be made. One consists in providing the plate 2 on one surface with a slight depression 3, in which can be placed a suitable material 4 of such a nature that its condition, color, or other characteristic changes under the application of water or moisture. Various anilin powders may be used for this purpose, or simply pulverized lead from an indelible pencil. A variety of other agents will answer the purpose. This agent is placed in the concave depression 3, and then a coating of the paint or other material 5 is spread over the same. If this coating is impervious to water no moisture will reach the chemical agent 4, and consequently its color or condition will remain unchanged. It is for this reason that the plate 2 is preferably of glass or other transparent material, so that the condition of this agent can be readily observed. Should, however, the coating of paint not be impervious to moisture, this agent will change color. This action can be readily observed, and therefore the moisture-repelling quality of the material accurately tested.

In case a more severe test of the water-repellant qualities or of acid or alkaline repellant qualities is to be made a coating of the paint will be spread upon some smooth surface and after it dries or sets will be carefully removed and placed in the form of an ordinary filter-paper 6 in an ordinary filtering-funnel 7, which will be placed in a suitable tube, such as an ordinary glass test-tube 8, supported in the receptacle 1, which test-tube at its bottom contains a quantity of chemical agent 9 of the character above referred to. The funnel above the film 6 will be filled with water or an acid or alkaline liquid, and in order to hold the funnel against undue movement the stem 10 of the funnel will be provided with a spacing-gland 11, which may be a disk of rubber or the like. If the film 6 is not entirely water or liquid proof, the chemical agent in the bottom of the test-tube will soon be affected.

In order to test the non-precipitating or non-caking qualities of the material, I provide one or more other tubes 12, which will be filled with a sample of the material or materials and allowed to stand. From day to day these tubes can be tested by plunging down into them a broom-straw or the like, and if the material has a tendency to precipitate or cake at the bottom this test will bring out such fact. A plurality of such tubes preferably will be employed, so that comparisons between several similar materials may be made.

The plate 2 and tubes 8 and 12 will be held in position by any convenient means, preferably so constructed that said parts can be readily removed when desired. I have shown for this purpose clamps 13, which hook over the top edges of the cup 1, and either provided with a clamp 14 for engaging the edge of the plate 2 or with rings 15 for receiving the tubes 8 and 12.

The device as a whole is very compact and neat of appearance, so that it can be set upon the desk or table of a user or purchaser and all of the tests can be observed from day to day and progress of changes noted. This simple device contains the means for testing the smoothness of spreading of the material, its tendency to streak, run, or sag on smooth vertical surfaces, also the water or moisture repellant qualities of the material, and also the tendency of the material to precipitate or cake at the bottom of a storage-receptacle, the latter being a good test of whether the solid parts of the material are well held in suspension in the liquid thereof.

I do not limit myself to the exact form and arrangement of parts shown.

The various test-tubes may, if desired, be hung on the outside of the cup; but it is preferred to have all the parts on the inside, as they will therefore be less liable to injury or disturbance.

What I claim is—

1. A device for testing paint and the like, comprising a suitable support, and a transparent plate held thereby in a vertical position and provided with a depression on one face to receive a chemical agent and adapted to have the material to be tested spread on its face and over the chemical agent in said depression.

2. A device for testing paint and the like, comprising a transparent receptacle, and a transparent smooth-faced plate removably supported therein in a vertical position and provided with a depression in its face to receive a chemical agent and adapted to have the material to be tested spread on its smooth face and over the chemical agent.

In testimony whereof I, the said CHARLES SHANNON, have hereunto set my hand.

CHARLES SHANNON.

Witnesses:
 ROBERT C. TOTTEN,
 G. KREMER.